United States Patent
Goto et al.

(10) Patent No.: US 6,746,057 B2
(45) Date of Patent: Jun. 8, 2004

(54) THREADED JOINT FOR STEEL PIPES HAVING IMPROVED GALLING RESISTANCE AND RUST-PREVENTING PROPERTIES

(75) Inventors: Kunio Goto, Kobe (JP); Toshiro Anraku, Nishinomiya (JP)

(73) Assignee: Sumitomo Metal Industries, Ltd., Osaka (JP)

( * ) Notice: Subject to any disclaimer, the term of this patent is extended or adjusted under 35 U.S.C. 154(b) by 0 days.

(21) Appl. No.: 10/253,421

(22) Filed: Sep. 25, 2002

(65) Prior Publication Data

US 2003/0094810 A1 May 22, 2003

Related U.S. Application Data

(63) Continuation of application No. PCT/JP02/00466, filed on Jan. 23, 2002.

(30) Foreign Application Priority Data

Jan. 25, 2001 (JP) ......................................... 2001-017257

(51) Int. Cl.$^7$ ........................... F16L 15/04; C23C 24/04
(52) U.S. Cl. ..................... 285/333; 285/390; 285/55; 285/94
(58) Field of Search ............... 285/333, 334, 285/390, 55, 94

(56) References Cited

U.S. PATENT DOCUMENTS 3,996,398 A * 12/1976 Manfredi .................... 427/191
4,468,309 A * 8/1984 White .......................... 204/192

(List continued on next page.)

FOREIGN PATENT DOCUMENTS

| JP | 59-9312 B2 | 3/1984 |
|----|------------|--------|
| JP | 61-79797 A | 4/1986 |
| JP | 62-258283 A | 11/1987 |
| JP | 03-247777 | 11/1991 |
| JP | 3-78517 B2 | 12/1991 |
| JP | 04-110396 | 4/1992 |
| JP | 8-103724 A | 4/1996 |
| JP | 8-105582 A | 4/1996 |
| JP | 8-233163 A | 9/1996 |
| JP | 8-233164 A | 9/1996 |
| JP | 9-72467 A | 3/1997 |
| JP | 10-158676 | 6/1998 |
| JP | 11-050078 | 2/1999 |
| JP | 11-173471 | 6/1999 |
| JP | 2000-130654 | 5/2000 |
| JP | 2001-065751 | 3/2001 |

*Primary Examiner*—Eric K. Nicholson
(74) *Attorney, Agent, or Firm*—Burns, Doane, Swecker & Mathis, L.L.P.

(57) ABSTRACT

In a threaded joint for steel pipes comprising a pin and a box capable of mating with each other, the pin having an externally threaded portion and an unthreaded metal contact portion as a mating surface, and the box having an internally threaded portion and an unthreaded metal contact portion as a mating surface, the mating surface of at least one of the pin and the box is coated with a lower porous zinc or zinc alloy layer by blast plating and with an upper coating which is either a solid lubricating coating (comprising a lubricating powder in an organic or in organic binder) or a liquid, heavy metal powder-free coating (e.g., a liquid coating based on a highly basic organic acid metal salt such as a highly basic metal sulfonate). The threaded joint exhibits improved galling resistance, rust-preventing properties, and gas tightness even after exposure to a high temperature and makes it possible to perform repeated fastening (make-up) and loosening (break-out) in a high-temperature oil well without application of a compound grease containing a heavy metal powder.

20 Claims, 2 Drawing Sheets

U.S. PATENT DOCUMENTS

| | | | |
|---|---|---|---|
| 4,474,651 A | * 10/1984 | Yauchi et al. | 204/34 |
| 4,630,849 A | * 12/1986 | Fukui et al. | 285/55 |
| 4,758,025 A | *  7/1988 | Frick | 285/55 |
| 4,871,194 A | * 10/1989 | Kawashima et al. | 285/55 |
| 5,064,224 A | * 11/1991 | Tai | 285/94 |
| 5,253,902 A | * 10/1993 | Petelot et al. | 285/94 |
| 5,427,418 A | *  6/1995 | Watts | 285/94 |
| 5,678,608 A | * 10/1997 | Fontana | 285/94 |
| 6,027,145 A | *  2/2000 | Tsuru et al. | 285/94 |
| 6,394,190 B2 | *  5/2002 | Linden | 285/55 |

* cited by examiner

THREADED JOINT FOR STEEL PIPES HAVING IMPROVED GALLING RESISTANCE AND RUST-PREVENTING PROPERTIES

This application is a continuation of International Application No. PCT/JP02/00466 filed on Jan. 23, 2002 and claims priority under 35 U.S.C. §§ 119 and/or 365 to 2001-17257 filed in Japan on Jan. 25, 2001; the entire content of which is hereby incorporated by reference.

TECHNICAL FIELD

This invention relates to a threaded joint for steel pipes and particularly oil well pipes which has improved galling resistance, rust-preventing properties and gas tightness, and which can be used without the need to apply a liquid lubricating grease containing a heavy metal powder such as a compound grease.

BACKGROUND ART

Oil well pipes such as tubing and casing used in the drilling of oil wells are typically connected to each other by threaded joints. In the past, the depth of oil wells was typically 2000 to 3000 meters, but more recently, the depth of oil wells may reach 8,000 to 10,000 meters in offshore oil fields and other deep wells. A threaded joint for oil well pipes is subjected to various forces in its environment of use, including loads such as axial tensile forces caused by the weight of the oil well pipe and the threaded joint, the combination of internal and external pressures, and geothermal heat which increases as the depth increases. Therefore, a threaded joint needs to be able to maintain gas tightness without breakage in such environments.

During the process of lowering tubing or casing into a well, a joint which is once fastened for connection often needs to be loosened and then re-fastened. API (American Petroleum Institute) requires that there be no occurrence of galling, which is unrecoverable seizing, and that gas-tightness be maintained even if fastening (make-up) and loosening (break-out) are repeated ten times for a tubing joint and three times for a casing joint.

Oil well pipes are generally connected using a threaded joint with a pin-box structure having a metal to metal contact portion forming a good seal. In this threaded joint, typically, a pin is formed on the outer surface of each end of an oil well pipe, the pin having an externally threaded portion and a metal contact portion without threads. Such a metal contact portion is hereunder referred to as an "unthreaded metal contact portion". A mating box is formed on the inner surface of a separate, sleeve-shaped coupling member, and it has an internally threaded portion and an unthreaded metal contact portion so as to mate with the corresponding threaded and unthreaded portions of the pin. When the pin is screwed into the box for fastening, the unthreaded metal contact portions of the pin and the box are made to tightly contact each other to form a metal seal.

In order to guarantee adequate sealing properties by the metal seal of a threaded joint in the environment of an oil well pipe, an extremely high surface pressure which may exceed the yield point of the material for the threaded joint must be applied to the unthreaded metal contact portions during fastening. This high pressure makes it easy for galling to take place. Therefore, prior to fastening, a lubricating grease called a compound grease, which is a viscous, flowable liquid, is applied to the metal contact portions and the threads in order to impart an increased galling resistance and gas tightness. Since the compound grease has good rust-preventing properties, it is frequently applied to a threaded joint before shipping the joint so as to prevent the joint from rusting before use in an oil well.

It has been proposed in the prior art to subject a threaded joint to surface treatment in order to improve the retention of a compound grease and impart decreased friction.

For example, Japanese Unexamined Patent Publication No. 61-79797 (1986) discloses a threaded joint having a threaded portion plated with Zn or Sn and a metal seal (unthreaded metal contact portion) plated with gold or platinum. Japanese Examined Patent Publication No. 3-78517 (1991) discloses a pipe joint having a coating of a synthetic resin which contains 20–90% of molybdenum disulfide having a particle diameter of 10 micrometers or less dispersed therein. Japanese Unexamined Patent Publication No. 8-103724 (1996) discloses a method for the surface treatment of a steel pipe joint comprising forming a lower manganese phosphate chemical conversion coating and an upper molybdenum disulfide-containing resin coating. Japanese Unexamined Patent Publication No. 8-105582 (1996) discloses a method for the surface treatment of a pipe joint comprising forming a first nitride layer, a second iron or iron alloy plated layer, and a third, uppermost molybdenum disulfide-containing resin coating.

Japanese Unexamined Patent Publication No. 62-258283 (1987) discloses a joint for oil well pipes which has a porous plated coating of zinc or a zinc alloy at least on the surface of its metal seal portion, the coating being formed by blast plating which is performed by blasting with particles having a core of iron or an iron alloy coated with a zinc or zinc alloy layer. It is described therein that the plated coating does not suffer from delayed fracture caused by hydrogen embrittlement and has good retention of a lubricant due to its porous nature, resulting in the advantage that gas tightness and galling resistance can be attained even with oil well pipes of a high-strength, high alloy steel. Thus, the coating formed by blast plating is contemplated using a compound grease as a lubricant.

All the threaded joints disclosed in the above-described patent publications are supposed to use with a compound grease to assure sufficient resistance to galling. However, the use of a compound grease involves problems with respect to the environment and gas tightness at high temperature as described below.

A compound grease contains a large amount of a powder of a heavy metal such as lead, zinc, or copper. Since a part of a compound grease applied to a threaded joint is discharged into the surrounding environment by washing off or by running out during fastening, the use of a compound grease raises a concern of causing environmental pollution. In addition, the application of compound grease worsens the work environment.

Recently, high-temperature oil wells having a temperature as high as 250–300° C. due to an increased depth, as well as steam-injected oil wells into which steam at a high temperature close to the critical temperature (e.g., around 350° C.) is injected in order to improve oil recovery have increased. Threaded joints for oil wells which are used in such a high-temperature environment are required to have a good heat resistance, as evidenced by maintaining gas tightness in a test where a joint which has been fastened is kept at a temperature above 350° C. for a certain period and then subjected to loosening and re-fastening. With a compound grease, the lubricity may decrease at such a high temperature due to evaporation of one or more constituents of the grease, thereby leading to a failure to attain a desired gas tightness when the loosened joint is re-fastened in the test.

In order to eliminate the need to apply a compound grease, a threaded joint having a solid lubricating coating has been proposed. For example, a threaded joint having a solid lubricating coating which comprises a resin such as an epoxy resin having molybdenum disulfide as a solid lubricant dispersed therein is disclosed in Japanese Unexamined Patent Publications Nos. 8-233163 (1996), 8–233164 (1996), and 9-72467 (1997).

However, such a solid lubricating coating is inferior to a compound grease with respect to ability to protect a threaded joint from rusting under field conditions from shipment of the threaded joint to the use thereof in an oil well. Therefore, the threaded joint is apt to rust and thus form blisters or cause debonding in the solid lubricating coating, which in turn makes fastening of the joint unstable, leading to occurrence of galling or a decrease in gas tightness.

DISCLOSURE OF THE INVENTION

An object of the present invention is to provide a threaded joint for steel pipes having improved galling resistance, gas tightness, and rust-preventing properties, which can assure gas tightness in its metal seal portion after being subjected to fastening and loosening repeatedly without application of a heavy metal powder-containing liquid lubricating grease such as a compound grease.

Another object of the present invention is to provide a threaded joint for steel pipes having improved galling resistance, gas tightness, and rust-preventing properties, which can assure gas tightness in its metal seal portion after being subjected to fastening and loosening repeatedly even if it is used to fasten oil well pipes placed in a high temperature environment such as encountered in a deep, high-temperature oil well or a steam-injected oil well and/or even if it is made of any of a wide variety of steels including from a carbon steel to a high alloy steel.

The present inventors have found that these objects can be achieved by forming, on the surface of a threaded portion and an unthreaded metal contact portion of a threaded joint, a lower or undercoat layer of a porous zinc or zinc alloy coating such as formed by impact plating, e.g., such as blast plating and an upper solid lubricating coating or liquid, heavy metal powder-free lubricating coating.

Although it is not intended to be bound by any theory, the mechanism for this is considered to be as follows.

A blast-plated coating of zinc or a zinc alloy can be formed on the surface of a threaded joint for steel pipes irrespective of the steel material for the joint which encompasses from a carbon steel to a high alloy steel containing more than 13 wt % Cr by employing, as a blasting material, particles having an iron-based core the surface of which is coated with zinc or a zinc alloy as disclosed in Japanese Examined Patent Publication No. 59-9312 (1984).

Unlike an electroplated coating, the resulting blast-plated coating is porous. Therefore, when a solid or liquid lubricating coating is formed thereon, the lower blast-plated coating can improve adhesion of the solid lubricating coating or retention of the liquid lubricating coating. As a result, it is possible to exploit the lubricating coating to the best of its performance and thus attain improved galling resistance and gas tightness without the use of a compound grease.

The zinc present in the lower layer is a base metal and it ionizes in preference to iron constituting the substrate threaded joint and thus exhibits a sacrificial protection effect to prevent corrosion of the joint. However, because the porous coating of the lower layer includes numerous voids and has a large surface area, the sacrificial protection effect of this layer tends to be lost soon if the lower layer is not treated anymore. The formation of the overlaid lubricating coating serves to seal the voids of the lower layer and allows the lower layer to have a sustained protection effect to achieve improved rust-preventing properties. In particular, when the overlaid coating is a solid lubricating coating, a still greater improvement in galling resistance, rust-preventing properties, and gas tightness can be attained, thereby making it possible to provide a threaded joint having improved performance even in a high temperature environment.

Thus, in order to improve galling resistance, rust-preventing properties, and gas tightness, it is important that a liquid or preferably solid lubricating coating is formed on a lower porous zinc or zinc alloy layer.

The present invention is a threaded joint for steel pipes comprising a pin and a box capable of mating with each other, the pin having an externally threaded portion and an unthreaded metal contact portion as a mating surface, and the box having an internally threaded portion and an unthreaded metal contact portion as a mating surface, characterized in that the mating surface of at least one of the pin and the box is coated with a lower porous zinc or zinc alloy layer and an upper lubricating coating selected from a solid lubricating coating and a liquid, heavy metal powder-free coating.

A threaded joint according to an embodiment of the present invention has the porous zinc or zinc alloy layer and the overlaid lubricating coating on the mating surface of only one of the pin and the box. In this embodiment, the other mating surface may be either uncoated or coated with one or more coatings selected from a porous zinc or zinc alloy layer, a metal plated coating, a phosphate coating, an oxalate coating, and a borate coating.

DESCRIPTION OF EMBODIMENTS OF THE INVENTION

Figure 1:
FIG. 1 is a schematic diagram showing the assembled structure of a steel pipe and a threaded coupling member connected to the pipe at the time of shipment.

As illustrated in FIG. 1, a typical steel pipe for use as an oil well pipe is shipped in a state in which a steel pipe A has a sleeve-shaped coupling member B previously connected to one end thereof. The steel pipe A has an externally threaded portion 3A on the outer surface at each end to form a pin 1. The threaded coupling member B has an internally threaded portion 3B on its inner surface at each side to form a box 2. The pin 1 and the box 2 have shapes such that they are capable of mating to each other.

In principle, a steel pipe A may have a pin formed on its one end and a box formed on its opposite end so that two steel pipes can be connected to each other without using a separate coupling member. It is also possible for a steel pipe A to have an internal thread formed on the inner surface at each end to define a box and for a coupling member B to have an external thread on the outer surface on each side to define a pin.

Figure 2:
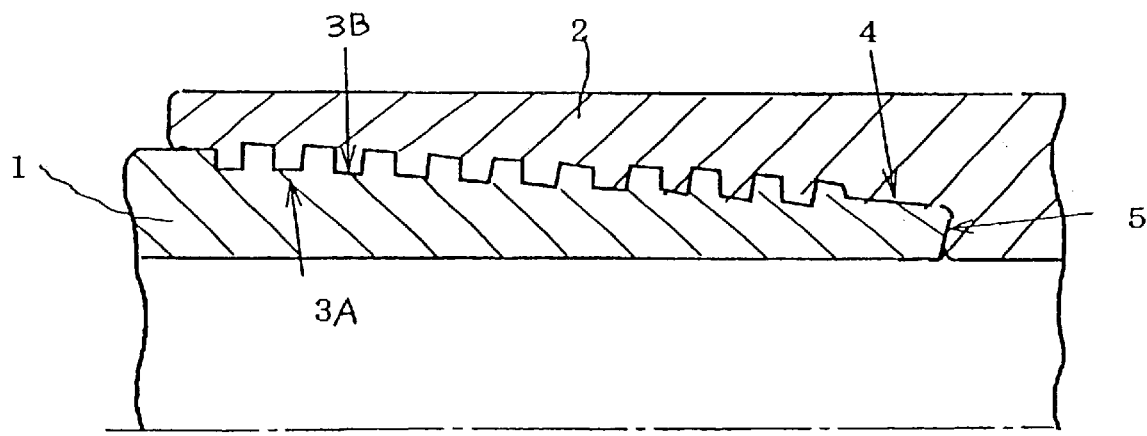
FIG. 2 is a schematic diagram showing a threaded joint for steel pipes.

FIG. 2 schematically shows the structure of a threaded joint for steel pipes which comprises a pin and a box each having a metal seal portion. A pin 1, which is typically formed on the outer surface of a steel pipe at each of its ends, is comprised of an unthreaded metal contact portion 4 located at the tip of the pipe and an externally threaded portion 3A extending inwardly from the metal contact portion 4. On the other hand, a box 2, which is typically formed on the inner surface of a threaded coupling member on each side and which is capable of mating with the pin 1, is comprised of an internally threaded portion 3B extending inwardly from the tip of the member and an unthreaded metal contact portion 4 located inward of the threaded portion 3B. The threaded portions 3A and 3B and the unthreaded metal contact portions 4 of the pin 1 and box 2 constitute mating surfaces.

Figure 3:
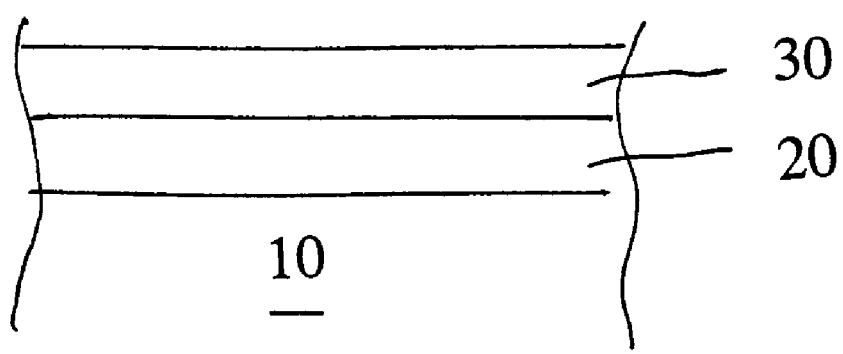
FIG. 3 is a cross-section of a portion of the threaded joint wherein a substrate includes a lower layer and an upper coating.

The mating surfaces of the pin and the box of a threaded joint are required to have galling resistance, gas tightness, and rust-preventing properties. According to the present invention, and with reference to FIG. 3, the mating surface 10 of at least one of the pin and the box of a threaded joint is coated with a lower porous zinc or zinc alloy layer 20 and an upper solid lubricating coating 30 or liquid, heavy metal powder-free lubricating coating 30, thereby making it possible to provide the mating surface with all the above-described properties required of it without application of a compound grease. Contrary to the case where a compound grease is applied to the mating surface, the mating surface coating in the above-described manner can exhibit these properties effectively even in a high-temperature environment.

The lower porous zinc or zinc alloy layer formed on the mating surface of a threaded joint may be any porous coating of zinc or a zinc alloy having good adhesion to the steel surface of the threaded joint. Such a porous coating can be formed by an impact plating method which is one of dry process plating methods. Impact plating produces a plated coating composed of metal particles which are laid one on another and bonded strongly to the substrate surface. The plated coating includes numerous, uniformly distributed, minute voids between the particles. The impact plating method includes mechanical plating in which particles are impinged on an object to be plated in a rotating barrel and blast plating in which particles are impinged on an object to be plated by means of a blasting apparatus.

Since only the mating surface of a threaded joint needs to be plated according to the present invention, blast plating which is capable of local plating is suitable. Blasting apparatuses which can be used for blast plating include a high pressure fluid blasting apparatus in which particles are blasted by use of a high pressure fluid such as compressed air and a mechanical blasting apparatus using a rotating blade such as an impeller. Both of these apparatuses can be employed.

Particles for use in impact plating such as blast plating according to the present invention are metal particles having zinc or a zinc alloy at least on the surface thereof. Although the particles may be comprised entirely of zinc or a zinc alloy, preferred are blasting particles disclosed in Japanese Examined Patent Publication No. 59-9312 (1984). The blasting particles are particles having a core of iron or an iron alloy which is coated with a zinc or zinc alloy layer forming an iron-zinc alloy layer between them.

Such particles can be prepared, for example, by coating a powder of iron or an iron alloy as a core with zinc or a zinc alloy (e.g., an Zn—Fe—Al alloy) by electroless and/or electrolytic plating followed by heat treatment to form an interfacial iron-zinc alloy layer, or by a mechanical alloying method. They are commercially available under the tradename "Z Iron" from Dowa Teppun Kogyo, Japan. Preferably these particles have a content of zinc or a zinc alloy in the range of from 20 to 60 wt % and a particle size of from 0.2 to 1.5 mm.

When the particles having an iron-based core coated with zinc or a zinc alloy are blasted onto a substrate, only the zinc or zinc alloy with which the core is coated adheres to the substrate, thereby forming a coating of zinc or a zinc alloy on the substrate. The blast plating method can form a porous plated coating having good adhesion on a steel surface irrespective of steel composition. Therefore, it is possible to form a porous zinc or zinc alloy layer having good adhesion on a mating surface of a threaded joint of any of a wide variety of steel materials from a carbon steel to a high alloy steel.

A threaded joint according to the present invention is prevented from rusting even in an high-temperature, high-humidity environment, due to the lower layer of a porous plated coating which contains zinc capable of exhibiting good sacrificial protection. This protection by the lower layer of the porous zinc-containing coating is sustained by covering it with an upper solid or liquid lubricating coating. The porous nature of the underlying layer allows the lubricating coating to have good adhesion when it is solid or good retention when it is liquid.

The thickness of the lower zinc or zinc alloy layer is preferably from 2 to 40 micrometers in view of rust-preventing properties and adhesion. Sufficient rust-preventing properties may not be assured with a thickness of less than 2 micrometers. A thickness of greater than 40 micrometers may decrease the adhesion of the overlaid solid or liquid lubricating coating. The thickness is more preferably from 5 to 30 micrometers and most preferably from 10 to 25 micrometers.

In view of the adhesion of the lower layer, it is preferable that the substrate mating surface of a threaded joint on which the lower layer is formed have a surface roughness of from 3 to 30 micrometers indicated by Rmax. Sufficient adhesion may not be assured with a surface roughness of less than 3 micrometers indicated by Rmax. On the other hand, a surface roughness of the substrate which is greater than 30 micrometers (Rmax) causes the threaded joint to have an increased friction, as a result of which the lower layer may tend to be broken or detached by failure to withstand a shearing force or compressive force generated by a high pressure applied during fastening of a threaded joint.

In order to adjust the surface roughness of the mating surface of a threaded joint to the range of from 3 to 30 micrometers (Rmax), the mating surface may be subjected to a suitable pretreatment such as pickling or blasting prior to the formation of the lower zinc or zinc alloy layer by impact plating. The pretreatment is also advantageous in that it exposes an active fresh surface, thereby increasing the adhesion of the lower layer formed on the surface. The blasting may be performed by any known technique such as sand blasting, shot blasting, grit blasting, wire blasting, or the like. Although it is preferred to perform pretreatment of the mating surface as described above, the objects of the present invention can be achieved by forming the zinc or zinc alloy layer by impact plating on the surface without such pretreatment.

Preferably the porous zinc or zinc alloy layer formed on the mating surface of a threaded joint has a surface roughness of from 5 to 40 micrometers in Rmax in the cases where a lubricating coating is formed thereon. If it has an Rmax of less than 5 micrometers, the lubricating coating may have insufficient adhesion or retention. On the other hand, if it has an Rmax of greater than 40 micrometers, the threaded joint may have an increased friction and the lower layer may tend to be broken or detached by failure to withstand a shearing force or compressive force generated by a high pressure applied during fastening of a threaded joint. In an embodiment where only one or a first element of the pin and the box is subjected to surface treatment according to the present invention while the other second element is surface-treated so as to form the porous zinc or zinc alloy layer alone, the zinc or zinc alloy layer formed on the second element preferably has a smaller surface roughness of from 1 to 10 micrometers in Rmax in order to assure the durability of the lubricating coating formed on the first element. The surface roughness of a zinc or zinc alloy layer formed by blast plating may be controlled by the diameter or coating thickness of the particles to be blasted and the blasting velocity.

On the lower layer of a porous zinc or zinc alloy plated coating, a solid lubricating coating, or a liquid lubricating coating which is free from a heavy metal powder is formed. The lubricating coating is usually formed by application, which may be performed in any suitable method known in the art including brush coating, dipping, and air or airless spraying. Since the lower layer is porous, it can provide the overlaid solid or lubricating coating with good adhesion or retention, respectively.

A solid lubricating coating is basically constituted by a binder and a powder exhibiting a solid lubrication action (hereunder such a powder being referred to as a "lubricating powder") distributed in the binder. Such a coating can be formed from a coating composition comprising a lubricating powder dispersed in a binder-containing fluid. In the resulting solid lubricating coating, the lubricating powder is bonded to the threaded joint by the binder, but it can be stretched to make it thin by the pressure applied during fastening of a threaded joint to exert its lubricity.

Examples of the lubricating powder include but are not limited to powders of molybdenum disulfide, tungsten disulfide, organic molybdenum compounds (e.g., molybdenum dialkylthiophosphates and molybdenum dialkylthiocarbamates), PTFE (polytetrafluoroethylene), and BN (boron nitride). One or more of these may be used.

The binder may be either an organic resin or an inorganic polymeric compound.

An organic resin having thermal resistance and a moderate level of hardness and wear resistance is suitable for use as a binder. Examples of such a resin include thermosetting resins such as epoxy resins, polyimides, polyamideimides, polycarbodiimides, phenolic resins, and furan resins, as well as thermoplastic resins such as polyethersulfones, polyetheretherketones, polyethylenes, and silicone resins. Preferred is a thermosetting resin.

A lubricating powder is dispersed in a resin fluid, which comprises an organic resin dissolved or dispersed in a suitable solvent, to form a coating composition. The solvent may be one or more classes selected from various low-boiling solvents including hydrocarbons (e.g., toluene) and alcohols (e.g., isopropyl alcohol) depending on the resin used.

The coating composition is applied onto the above-described lower layer formed on the mating surface of a threaded joint and dried to remove the solvent to form a solid lubricating coating. In the cases where the binder is a thermosetting resin, the resulting solid lubricating coating is preferably subjected to heat treatment for curing. The heat treatment is preferably performed at a temperature of 120° C. or higher and more preferably of 150–380° C. for a period of 30 minutes or longer and more preferably of 30–60 minutes.

An inorganic polymeric compound which can be used as a binder is a metal oxide-type compound having a three-dimensional cross-linked structure of metal-oxygen bonds such as Ti—O, Si—O, Zr—O, Mn—O, Ce—O, or Ba—O. Such an inorganic polymeric compound can be formed by hydrolysis of a hydrolyzable organometallic compound exemplified by a metal alkoxide as a starting compound followed by condensation of the resulting hydrolyzate. Useful metal alkoxides include those compounds in which the alkoxy groups are lower ones such as methoxy, ethoxy, isopropoxy, propoxy, isobutoxy, butoxy, tert-butoxy, or the like. A preferable metal alkoxide is a titanium or silicon alkoxide, and particularly a titanium alkoxide. The most preferable compound is titanium isopropoxide since it has excellent film-forming properties.

As the starting compound, a hydrolyzable inorganic compound such as titanium tetrachloride can also be used in place of the organometallic compound. In addition, part of the hydrolyzable organometallic compound may be a compound such as a silane coupling agent or a titanate coupling agent in which part of the organic groups attached to a metal are non-hydrolyzable groups (e.g., alkyl groups and in particular substituted alkyl groups having a functional group such as an amino or epoxy group). In such cases, the non-hydrolyzable groups remain in the inorganic polymeric compound produced by hydrolysis of the starting compound and subsequent condensation of the hydrolyzate. Therefore, the product cannot be referred to as an "inorganic" polymeric compound in a strict sense, but it is included in the inorganic polymeric compound which can be used herein.

When the binder is an inorganic polymeric compound, a lubricating powder can be dispersed in a solution of a starting material for that compound such as a metal alkoxide to form a coating composition. The coating composition is applied onto the above-described lower layer formed on the mating surface of a threaded joint and then subjected to humidification and optionally heating to promote hydrolysis and condensation of the metal alkoxide, resulting in the formation of a solid lubricating coating comprising the lubricating powder distributed in a coating of an inorganic polymeric compound formed from metal-oxygen bonds. The solvent used to dissolve a metal alkoxide may be selected from various organic solvents such as alcohols (e.g., ethyl alcohol, isopropyl alcohol, and butyl alcohol), ketones, hydrocarbons, and halogenated hydrocarbons. In order to promote the formation of a coating, the metal alkoxide in the resulting solution may previously be partially hydrolyzed. In addition, a small amount of water and/or an acid as a hydrolytic catalyst may be added to the coating composition in a small amount in order to accelerate hydrolysis after application of the composition.

The humidification which is performed following application to promote hydrolysis of the metal alkoxide may be carried out by allowing it to stand in the atmosphere, preferably having a humidity of 70% or higher for a certain period. The humidification is preferably followed by heating to accelerate the hydrolysis of the alkoxide, condensation of the hydrolyzate, and discharge of the alcohol formed as a hydrolyzation by-product, thereby making it possible to form a coating in a short period. This heating also causes the resulting solid lubricating coating to have a strengthened adhesion and an improved galling resistance. The heating is preferably carried out at a temperature close to the boiling point of the alcohol by-product in the range of from 100 to 200° C. Hot air heating is more effective.

The mass ratio (or weight ratio) of the lubricating powder content (B) to the binder content (A), i.e., B/A is preferably at least 0.3 and at most 9.0. If this ratio is less than 0.3, the resulting solid lubricating coating has a decreased lubricity and may not afford a sufficient improvement in galling resistance. If the mass ratio B/A is greater than 9.0, the solid lubricating coating has a decreased adhesion, resulting in problems including a significant removal of the lubricating powder from the coating. In cases where a further improvement in galling resistance is desired, such as in cases where an extremely large thread interference is desired in the threaded portion, the mass ratio B/A is more preferably at least 0.5 and at most 7.0. In the cases where a still higher level of galling resistance is desired as is the case with a high alloy steel, it is most preferably at least 3.0 and at most 6.5.

Preferably the solid lubricating coating has a thickness in the range of from 5 to 40 micrometers. The lubricating powder present in the lubricating coating extends so as to cover the entire mating surface under high pressure during fastening of the threaded joint, thereby exhibiting improved galling resistance. If the thickness of the lubricating coating is less than 5 micrometers, the amount of the lubricating powder present in the lubricating coating is so small that the improvement in lubricity by the above-described mechanism is not attained sufficiently. A lubricating coating having a thickness greater than 40 micrometers tends to be detached easily. Such a thick coating may also result in a decreased gas tightness due to insufficient tightness during fastening, or if the pressure applied by fastening is increased to assure gas tightness, galling will occur easily. The thickness of the solid lubricating coating is more preferably in the range of 15–40 micrometers.

Various additives may optionally be added to the solid lubricating coating in an amount that does not interfere with the galling resistance of the coating. For example, one or more powders selected from the materials zinc, chromates, silica, and alumina may be added, thereby making it possible to improve the rust-preventing properties of the solid lubricating coating itself.

In embodiments where the lower layer is overlaid with a liquid lubricating coating instead of a solid lubricating coating, a liquid lubricating coating which is free from a heavy metal powder is employed. The liquid lubricating coating comprises a base lubricant in the form of a viscous liquid which exhibits a high lubricity and other optional additives.

The base lubricant is in liquid form, but in view of its high viscosity, the base lubricant is preferably diluted with a solvent to form a coating composition. As a result, it can form a coating having a more uniform thickness and composition. Such dilution also serves to improve the wettability of the underlying surface to be coated and spreadability of the lubricant and causes the base lubricant and other additives to be adsorbed easily by the underlying surface, thereby resulting in the efficient formation of a coating. The solvent is evaporated after application of the coating composition and hence it is not included in the resulting liquid lubricating coating.

The solvent used to form a coating composition is preferably a solvent having a high capability for dissolving or dispersing the base lubricant and other additives and a moderate volatility. Examples of such a solvent include petroleum solvents such as cleaning solvents and mineral spirits corresponding to industrial gasoline as specified by JIS K2201, aromatic petroleum naphtha, xylene, and cellosolves. A mixture of two or more of these may be used. Preferably the solvent has a flash point of at least 30° C., an initial boiling point of at least 150° C., and an end point of at most 210° C., since such a solvent is relatively easy to handle and vaporizes. The amount of the solvent in the coating composition is not critical, but it is preferably in the range of 25–80 wt % and more preferably in the range of 30–70 wt %. If the amount of the solvent is too small, it is difficult to achieve the above-described effects of the solvent adequately, or the viscosity of the coating composition becomes so high as to interfere with coating procedures. The presence of too large an amount of the solvent makes the resulting liquid lubricating coating too thin to provide the threaded joint with desired properties.

The base lubricant is the constituent having the highest contribution to the lubricity of the liquid lubricating coating. As the base lubricant, a liquid substance having a high lubricity on its own may be used. A preferable base lubricant is a highly basic (over-basic) organic acid metal salt. However, the base lubricant is not limited thereto, and any other substance capable of forming a liquid lubricating coating having lubricity comparable to that of a highly basic organic acid metal salt may be employed.

The highly basic organic acid metal salt may be one or more classes selected from a highly basic metal sulfonate, a highly basic metal salicylate, a highly basic metal phenate, and a highly basic metal carboxylate. These highly basic organic acid metal salts are substances in viscous liquids containing an excess amount of an alkali or alkaline earth metal salt to makes them basic and having improved rust-preventing properties and lubricity.

The highly basic organic acid metal salt may be an alkali salt such as a lithium, sodium, or potassium salt or an alkaline earth metal salt such as a calcium, magnesium, or barium salt. For each of the above organic acid salts, an alkaline earth metal salt is preferable to an alkali metal salt, and a calcium salt is more preferable from the standpoint of galling resistance.

The sulfonic acid portion which constitutes a highly basic metal sulfonate may be a petroleum sulfonic acid, which is obtained by sulfonation of aromatic components in a petroleum distillate, or a synthetic alkylaromatic sulfonic acid. Examples of a synthetic sulfonic acid include dodecylbenzenesulfonic acid, dinonylnaphthalene-sulfonic acid, and the like. As described above, the sulfonate salt may be an alkali or alkaline earth metal salt, and preferably it is an alkaline earth metal salt and more preferably a calcium salt. By way of example, such a preferred highly basic calcium sulfonate will be explained below, but the highly basic metal sulfonate is not limited thereto. Highly basic calcium sulfonate is commercially available. Examples of a commercial product are Sulfol 1040 manufactured by Matsumura Petroleum Institute, and Lubrizol 5318 manufactured by Japan Lubrizol.

A highly basic calcium sulfonate is prepared by dissolving a neutral sulfonate salt in a suitable solvent, such as one selected from an aromatic hydrocarbon, an alcohol, and mineral oil, adding calcium hydroxide in an amount sufficient to give the base number required for the highly basic calcium sulfonate, and mixing. Thereafter, an excess amount of carbon dioxide gas to carbonate the added calcium hydroxide is passed through the mixture, which is then filtered in the presence of a filter aid such as activated kaolin.

The filtrate is distilled in vacuo to remove the volatile solvent, leaving the desired highly basic calcium sulfonate as a residue.

A highly basic calcium sulfonate prepared by this method is a viscous liquid substance, which contains colloidal fine particles of calcium carbonate dispersed in an oily substance in a stable manner. Since the dispersed particles of calcium carbonate can function as a solid lubricant, the highly basic calcium sulfonate can exhibit remarkably superior lubricity compared to a typical liquid lubricating oil. Furthermore, in the case in which the frictional surface has minute irregularities (surface roughness), the highly basic calcium sulfonate can exhibit an even more excellent galling-preventing effect on a threaded joint due to the combined effect of the micro-fluid film lubrication effect caused by hydrostatic pressure and the solid lubrication effect of the fine particles.

A highly basic metal salicylate may be an alkali or alkaline earth metal salt of an alkylsalicylic acid. The alkylsalicylic acid can be prepared by subjecting an alkyl phenol obtained by alkylation of phenol with an alpha-olefin having from about 14 to about 18 carbon atoms to the Kolbe-Schmitt reaction to introduce a carboxylic group.

The highly basic metal salicylate can be prepared by converting a neutral salicylate salt into a highly basic metal salt, e.g., calcium salt, by the same method as explained with respect to a highly basic calcium sulfonate. Examples of commercial products thereof include OSCA 431 and OSCA 453 of OSCA Chemicals, and SAP 005 of Shell Chemicals.

A highly basic metal phenate can be prepared by converting a neutral phenate salt into a highly basic metal salt, e.g., calcium salt, by the same method as described with respect to a highly basic metal sulfonate. The neutral phenate can be obtained by reacting an alkyl phenol as described above with a metal hydroxide in the presence of an elemental sulfur catalyst in an alcohol solvent.

The carboxylic acid portion which constitutes a highly basic metal carboxylate is preferably a monocarboxylic acid or a dicarboxylic acid, which preferably contains from 5 to 19 carbon atoms. Examples of a monocarboxylic acid include caproic acid, caprylic acid, capric acid, lauric acid, tridecylic acid, myristic acid, palmitic acid, stearic acid, isostearic acid, oleic acid, linoleic acid, linolenic acid, naphthenic acid, and benzoic acid. Examples of a dicarboxylic acid include suberic acid, azelaic acid, and sebacic acid. The method for converting a neutral salt into a highly basic salt may be the same as described above.

All the highly basic organic acid metal salts described above are viscous liquid or fluid substances which contain the excess alkali such as calcium carbonate in the form of fine particles dispersed in an oil. One or more of these highly basic organic acid metal sulfonates may be used as base lubricants. When using two or more base lubricants, they may be either of the same class (such as two highly basic metal sulfonates), or of different classes (such as a combination of a highly basic metal sulfonate and a highly basic metal phenate).

The higher the base number of the highly basic organic acid metal salt which is employed as a base lubricant, the greater the amount of the excess alkali fine particles contained therein and the higher the lubricity. In addition, a lubricating coating having a degree of basicity higher than a certain level has increased rust preventing properties due to its effect of neutralizing acidic substances which may cause rusting. For these reasons, the highly basic organic acid metal salt used in the present invention preferably has a base number (JIS K2501) of at least 40 mg KOH/g. However, a base lubricant having a base number exceeding 500 mg KOH/g has an increased hydrophilic nature and decreased rust preventing properties. The base number of the base lubricant is more preferably in the range of 100–500 mg KOH/g, and most preferably in the range of 250–450 mg KOH/g.

The content of highly basic organic acid metal salt present in a coating composition is preferably at least 10 wt %, more preferably at least 20 wt %, and most preferably at least 30 wt % based on the total solids content of the coating composition. If the content of the highly basic organic acid metal salt is less than 10 wt %, the resulting liquid lubricating coating may have insufficient lubricity and rust-preventing properties. It is also preferred that the amount of the base lubricant be selected so that the resulting lubricating coating has a base number of 40 to 500 mg KOH/g for the reason described above.

The lubricating coating composition which is used to form a liquid lubricating coating may contain a thermoplastic resin, which serves to increase the thickness of the resulting lubricating coating and also the galling resistance thereof when it is introduced into a frictional interface. Examples of useful thermoplastic resins include polyethylene resins, polypropylene resins, polystyrene resins, polymethylacrylate resins, styrene/acrylate copolymer resins, polyamide resins, and the like.

The thermoplastic resin is preferably present in the coating composition in the form of particles or in powder form rather than being dissolved therein. The thermoplastic resin in the form of particles can exert a lubricating action similar to that of a solid lubricant when introduced into a frictional interface and provide an increased improvement in galling resistance. For this purpose, the particles may be swollen. The density (JIS K7112) of the thermoplastic resin is preferably in the range of 0.9–1.2. On account of the need for the resin to easily deform on the frictional surface and to exhibit lubricity, the thermoplastic resin preferably has a thermal deformation temperature (JIS K7206) of 50–150° C. It is advantageous for the thermoplastic resin particles to have a small diameter in order to increase the thickness of the lubricating coating and improve its galling resistance. However, particles smaller than 0.05 micrometers in diameter cause the lubricating coating composition to have a markedly high tendency toward galling, thereby making it difficult to form a coating with a uniform thickness. Particles greater than 30 micrometers in diameter are difficult to introduce into a frictional interface and easily separate by settling or floating in the coating composition, thereby making it difficult to form a homogeneous coating. Accordingly, the particle diameter is preferably in the range of 0.05–30 micrometers, and more preferably it is in the range of 0.07–20 micrometers.

When a thermoplastic resin is added to a coating composition, its content is preferably 0.5–30 wt %, more preferably 1–20 wt %, and most preferably 2–15 wt % based on the total solids content of the coating composition. In the cases where the thermoplastic resin is in the form of particles, the addition of such particles in an excess amount may cause the coating composition to gell.

The coating composition used to form a liquid lubricating coating may further include one or more additives in addition to the above-identified constituents. Examples of these additives which are suitable for use in the present invention include lubricants other than the highly basic organic acid metal salts and extreme pressure agents. Examples of such other lubricants include but are not limited to fatty acid salts, synthetic esters, natural oils and fats, waxes, and mineral oil. Among these additives, a synthetic acid and an extreme pressure agent are preferably added to a coating composition since the former has the effect of increasing the plasticity of the thermoplastic resin and the latter has the effect of improving galling resistance.

A fatty acid salt exhibits properties similar to those of the above-described highly basic organic acid metal salt, although at a lower level, and it may be included in the coating composition as a kind of diluent. From the viewpoints of lubricity and rust-preventing properties, the fatty acid of the salt preferably has 12–30 carbon atoms. The fatty acid may be either a mixed fatty acid derived from a natural oil or fat or a single fatty acid compound. The fatty acid salt is preferably an alkaline earth metal salt, particularly a calcium salt, and it may be a neutral salt or a basic salt.

A synthetic ester has the effect of increasing the plasticity of the thermoplastic resin, and at the same time, it can increase the fluidity of the lubricating coating under hydrostatic pressure. A high-melting synthetic ester can also be used to adjust the melting point and the softness of the resulting lubricating coating. Synthetic esters suitable for use include fatty acid monoesters, dibasic acid diesters, and fatty acid esters of trimethylolpropane and pentaerythritol. Examples of a fatty acid monoester include monoesters of a carboxylic acid having 12–24 carbon atoms with a higher alcohol having 8–20 carbon atoms. Examples of a dibasic acid diester include diesters of a dibasic acid having 6–10 carbon atoms with a higher alcohol having 8–20 carbon atoms. Examples of the fatty acid constituting the fatty acid ester of trimethylolpropane or pentaerythritol are those having 8–18 carbon atoms.

Natural oils and fats such as beef tallow, lard, wool grease, palm oil, rape seed oil, and coconut oil; waxes such as natural wax or paraffin wax having a molecular weight of 150–500; and mineral oil or synthetic mineral oil having a viscosity of 10–300 cSt at 40° C. can be used to adjust the viscosity of the lubricating coating.

The amount of these other lubricants added to the coating composition is preferably at most 90 wt % and more preferably at most 75 wt % and most preferably at most 60 wt % based on the total solids content of the composition. Since other lubricants facilitate the formation of a uniform lubricating coating, it is preferred that the composition contain at least 5 wt % of one or more other lubricants. It is also preferred that the amount of other lubricants be selected so as to form a lubricating coating having a saponification number of 30–100 mg KOH/g.

An extreme pressure agent includes but is not limited to sulfurized oils and fats, polysulfides, phosphates, phosphites, thiophosphates, and dithiophosphoric acid metal salts.

Examples of the sulfurized oils and fats are those compounds having a sulfur content of 5–30 wt % prepared by heating an animal or vegetable oil or fat having unsaturated bonds with sulfur.

Examples of the polysulfides are those compounds of the formula: $R^1$—$S_c$—$R^2$ (where $R^1$ and $R^2$ are the same or different and stand for an alkyl group, an aryl group, an alkylaryl group, or an arylalkyl group having 4 to 22 carbons, and c is an integer from 2 to 5), and sulfurized olefins, each having 2–5 successive sulfide groups. Examples of preferred polysulfides include dibenzyl disulfide, di-tert-dodecyl polysulfide, and di-tert-nonyl polysulfide.

The phosphates, phosphites, thiophosphates, and dithiophosphoric acid metal salts may be those having the following formulas:

phosphate: $(R^3O)(R^4O)P(=O)(OR^5)$
phosphite: $(R^3O)(R^4O)P(OR^5)$
thiophosphate: $(R^3O)(R^4O)P(=S)(OR^5)$
dithiophosphoric acid metal salt: $[(R^3O)(R^6O)P(=S)—S]_2$-Me In the above formulas, $R^3$–$R^6$ each stand for an alkyl group, a cycloalkyl group, an alkylcycloalkyl group, an aryl group, an alkylaryl group, or an arylalkyl group each having up to 24 carbon atoms, or $R^4$ and $R^5$ may be hydrogen. Me stands for a metal selected from molybdenum (Mo), zinc (Zn), and barium (Ba).

Preferred examples of these compounds include tricresyl phosphate and dioctyl phosphate for the phosphates; tristearyl phosphite, tridecyl phosphite, and dilauryl hydrogen phosphite for the phosphites; tridodecyl and tritridecyl thiophosphates and trialkylphenyl thiophosphate for the thiophosphates; and zinc dialkyl dithiophosphate in which $R^3$ and $R^6$ are primary or secondary alkyl groups having 3–20 carbon atoms for the dithiophosphoric acid metal salts.

The amount of an extreme pressure agent in the coating composition is preferably in the range of 0–20 wt % and more preferably 1–15 wt % based on the total solids content of the composition. If the amount of the extreme pressure agent is too large, it may have an adverse effect on rust preventing properties.

The coating composition may further include one or more of an antioxidant, a preservative, a pour point depressant, and a viscosity index improver. Examples of the antioxidant include bisphenols such as methylene-4,4-bis(2,6-di-tert-butylphenol), alkylphenols such as di-tert-butylcresol, and naphthylamines. Examples of the pour point depressant and viscosity index improver include polymethacrylates and polyolefins. If present, usually the antioxidant is added in an amount of from about 0.01 to 1.0 wt % and the pour point depressant and viscosity index improver are added each in an amount of 1–5 wt % based on the total solids of the coating composition.

Preferably the coating composition used to form a liquid, heavy metal powder-free lubricating coating has a viscosity in the range of 2–300 cSt at 40° C. A coating composition having a viscosity of less than 2 cSt may result in the formation of a lubricating coating which is too thin to achieve adequate lubricity. A viscosity of larger than 300 cSt may adversely affect the applicability of the coating composition. The viscosity can be adjusted by the amount of the solvent.

A liquid lubricating coating which is free from a heavy metal powder can be formed by applying the above-described coating composition to the mating surface of a threaded joint having a lower zinc or zinc alloy layer previously formed thereon followed by heating, if necessary, to remove the solvent. The thickness of the resulting coating is preferably at least 10 micrometers which is sufficient to fill the minute gaps between mating surfaces such as between threads in order to assure gas tightness. If the thickness is less than 10 micrometers, the desired phenomenon of the liquid lubricating coating that the lubricant(s) seeps into a frictional surface or migrates from other gaps by the action of the hydrostatic pressure generated by fastening may not be produced sufficiently.

Since the liquid lubricating coating comprises a highly basic organic acid metal salt which exhibits an extremely high lubricity, the thickness needs not be increased excessively. Making the coating too thick not only causes the lubricant(s) to be wasted, but also adversely affects the retention of the liquid lubricating coating by the underlying porous zinc or zinc alloy layer. The upper limit on the thickness of the lubricating coating is not critical but it is generally 200 micrometers. A preferred thickness of the liquid lubricating coating is 20–150 micrometers.

The above-described two-layer surface treatment including the formation of a lower porous zinc or zinc alloy layer and of an upper solid lubricating coating or a liquid, heavy metal powder-free coating can be applied to the mating surface of one or both of the pin and the box constituting a threaded joint. Although it is preferred to apply such a two-layer surface treatment to the entire mating surface of the pin and/or box, it is also possible to apply it only to a part of the mating surface, such as only to the surface of the unthreaded metal contact portion in the mating surface.

The two-layer surface treatment can achieve the objects of the present invention even in the cases where it is applied to only either one of the pin or box, which is advantageous in terms of the costs. In such cases, the two-layer surface treatment is performed relatively easily on the joint element (normally a box) formed on the coupling member which is much shorter than the steel pipe. The other joint element (e.g., a pin), to which the two-layer surface treatment is not applied, may be uncoated. In particular, when the pin and the box are temporarily fastened before shipment as shown in FIG. 1, the other joint element, e.g., the pin, can be prevented from rusting even if it is uncoated, since the mating surface of the pin is brought into intimate contact with the surface-treatment layers formed on the mating surface of the box by the temporary fastening.

However, when a threaded coupling member is connected to a steel pipe on one end of the pipe as shown in FIG. 1, the resulting assembly has another pin and box at the opposite end of the steel pipe and in the unconnected half of the coupling member, respectively. When only the boxes formed on both sides of a coupling member are subjected to the two-layer surface treatment according to the present invention, the pin formed on a steel pipe at one end which is not connected to the coupling member is exposed nakedly to the atmosphere if it is uncoated.

When the surface treatment according to the present invention is applied to only one element of the pin and box, the other element may be subjected to a suitable surface treatment to form a coating capable of imparting rust-preventing properties solely or in combination with lubricity.

Such a coating includes a porous zinc or zinc alloy layer as employed as a lower layer in the present invention, a metal plating coating, a phosphate coating, an oxalate coating, and a borate coating. A porous zinc or zinc alloy layer and a metal plated coating have a high capability of imparting rust-preventing properties, while a phosphate coating, an oxalate coating, and a borate coating which are all formed by a chemical conversion treatment have a high capability of improving slide properties (lubricity).

The metal plating coating may be formed by zinc plating, zinc alloy plating, nickel plating, or copper plating, for example. The phosphate coating includes a manganese phosphate coating, a zinc phosphate coating, a zinc calcium phosphate coating, zinc iron phosphate coating, and the like. The oxalate coating can be formed, for example, by dipping into an aqueous solution of oxalic acid ($C_2H_2O_4$) to form a coating composed of metal oxalates such as iron oxalate ($FeC_2O_4$) and nickel oxalate ($NiC_2O_4$). The borate coating may be a coating of a metal borate such as potassium borate. The coating weight of these coatings may be selected so as to impart rust-preventing properties and/or lubricity sufficiently but not to an excessive amount. Two or more of these layers such as a lower porous zinc or zinc alloy layer or a metal plated coating and an upper phosphate, oxalate, or borate coating may be applied.

It is also possible to attach a suitable protector to an exposed pin and/or box to prevent it from rusting before use in an oil well.

EXAMPLES

The following examples are given to illustrate the present invention, and they are not intended to restrict it. In the following description, a mating surface comprising a threaded portion and an unthreaded metal contact portion of a pin is referred to as a pin surface and that of a box is referred to as a box surface.

The pin surface and the box surface of a threaded joint (outer diameter: 7 inches, wall thickness: 0.408 inches) made of a material selected from a carbon steel A, a Cr—Mo steel B, a 13% Cr steel C, and a high alloy steel D each having a composition shown in Table 1 were subjected to the surface treatment shown in Table 2, which indicates the steel mark (Table 1) of the threaded joint, and the conditions for pretreatment including the formation of a lower layer and for the formation of a solid lubricating coating or a liquid, heavy metal powder-free lubricating coating. The thickness of the lower layer and that of the lubricating coating were determined. Table 3 shows the composition of a coating composition used to form a liquid lubricating coating. The coating composition to form a solid or liquid lubricating coating was applied by brush coating.

The sand blasting shown in Table 2 was performed with #80 sand for a surface roughness of 10 micrometers or #62 sand for a surface roughness of 20 micrometers.

The Zn layer and the Zn—Fe layer shown in the column of pretreatment in Table 2 are a porous zinc layer and a porous zinc-iron alloy layer, respectively, formed by blast plating. The blast plating was performed by use of particles sold by Dowa Teppun Kogyo under the tradename "Z Iron" which had an iron core coated with a zinc metal or a zinc-iron alloy (Zn—Fe—Al). Those particles having a zinc coating were used to form a porous zinc layer and those having a zinc-iron alloy coating were used to form a porous zinc-iron alloy layer.

Among the solid lubricating coatings shown in Table 2, those in which the binder was an organic resin (e.g., a polyamideimide resin) were subjected, following the formation of the coating, to heat treatment for curing for 30 minutes at a temperature shown as "T" in Table 2 to harden the coating.

Solid lubricating coatings in which the binder was an inorganic polymeric compound having a Ti—O skeleton which is shown by "Ti—O" in Table 2 were formed by application of a coating composition which was prepared by dispersing a lubricating powder in a solution of titanium isopropoxide dissolved in a 3:1:3 mixed solvent of xylene: butyl alcohol: trichloroethylene. Thereafter, the coatings were humidified by being left to stand for 3 hours in the atmosphere, and were heated for 30 minutes by blowing hot air at 150° C.

In Table 2, "M" indicates the mass ratio of the lubricating powder to the binder (organic resin or inorganic polymeric compound) in a solid lubricating coating and "D" indicates the average particle diameter of the lubricating powder.

Liquid lubricating coatings which were free from a heavy metal powder were formed by application of a coating composition shown in Table 3 and were then allowed to stand for 12 hours at room temperature to evaporate the solvent.

The two-layer surface treatment according to the present invention was applied to the pin surface in Example 3, to both the box and pin surfaces in Example 4, and to the box surfaces in the remaining Examples.

For comparison, a lower layer of a manganese phosphate coating was formed in Comparative Example 1 and that of an iron plating and a manganese phosphate was formed in Comparative Example 2. They were both overlaid with a solid lubricating coating. Only a lower porous zinc layer was formed on both the pin and the box surfaces in Comparative Example 3.

By way of example, in Example 1 shown in Table 2, a threaded joint made of a carbon steel A having the composition shown in Table 1 was subjected to the following surface treatment. The box surface was subjected to mechanical grinding (to a surface roughness of 3 micrometers) and then blast plating to form a porous zinc layer having a thickness of 12 micrometers as a lower layer. Thereafter, a solid lubricating coating having a thickness of 27 micrometers was formed on the lower layer. The solid lubricating coating comprised a polyamideimide resin containing molybdenum disulfide powder having an average particle diameter of 5 micrometers, and the mass ratio of the molybdenum disulfide powder to the resin was 4:1. The resulting solid lubricating coating was then subjected to heat treatment for curing at 260° C. for 30 minutes to harden the coating. The pin surface was subjected only to mechanical grinding (to a surface roughness of 3 micrometers).

Also in Examples 2 to 13 and Comparative Examples 1 to 3, the pin and box of a threaded joint made of a steel indicated in Table 2 were subjected to surface treatment indicated in Table 2 in the above-described manner. The oxalate coating formed on the pin surface by chemical conversion treatment in Example 12 was thought to be a coating comprised of iron oxalate and nickel oxalate.

The surface-treated threaded joint in which the pin and the box were not fastened was tested for rust-preventing properties as follows. For the threaded joints of Examples 1 to 13 and Comparative Examples 1 and 2, the pin and/or box having a solid or liquid lubricating coating formed thereon was subjected to a salt spray test for 336 hours in accordance with JIS Z2371 and then examined for rusting. For the threaded joint of Comparative Example 3 in which a lubricating coating was not formed, both the pin and the box were tested in the above manner.

Using the threaded joints which had been subjected to the salt spray test, fastening (make-up) and loosening (break-out) were repeated up to a maximum of 20 times under the conditions shown in Table 4 to examine the occurrence of seizure and galling. In order to simulate an oil well in a high temperature environment, on the 11th and 16th cycles, make-up at room temperature was followed by heating for 24 hours at 400° C., and after the temperature cooled down to room temperature, break-out was performed. In the remaining 1st to 10th cycles, 12th to 15th cycles, and 17th to 20th cycles, make-up and break-out were performed at room temperature without heating. The make-up speed was 10 rpm and the make-up torque was 10340 ft·lbs.

Table 5 shows the results of seizure and galling in the repeated make-up and break-out test and rusting in the salt spray test.

TABLE 1

Steel Composition of Treaded Joint (wt %)
(balance: Fe and inevitable impurities)

| Mark | C | Si | Mn | P | S | Cu | Ni | Cr | Mo |
|---|---|---|---|---|---|---|---|---|---|
| A | 0.24 | 0.30 | 1.30 | 0.02 | 0.01 | 0.04 | 0.07 | 0.17 | 0.04 |
| B | 0.25 | 0.25 | 0.80 | 0.02 | 0.01 | 0.04 | 0.05 | 0.95 | 0.18 |
| C | 0.19 | 0.25 | 0.80 | 0.02 | 0.01 | 0.04 | 0.10 | 13.0 | 0.04 |
| D | 0.02 | 0.30 | 0.50 | 0.02 | 0.01 | 0.50 | 7.00 | 25.0 | 3.20 |

TABLE 2

| Example No.[1] | SM[2] | Pin[3] Pretreatment | Pin[3] Lubricating Coating | Box[4] Pretreatment | Box[4] Lubricating Coating |
|---|---|---|---|---|---|
| Ex. 1 | A | Grinding (R = 3) | None | 1. Grinding (R = 3) 2. Zn layer (t = 12) | Polyamideimide resin $MoS_2$ (D = 5, M = 4) (t = 27) (T = 260) |
| Ex. 2 | B | Grinding (R = 2) | None | 1. Sand blasting (R = 10) 2. Zn—Fe layer (t = 15) | Epoxy resin $MoS_2$ (D = 5, M = 5) BN (D = 3, M = 1) (t = 20) (T = 230) |
| Ex. 3 | A | 1. Grinding (R = 3) 2. Zn layer (t = 8) | Ti—O $MoS_2$ (D = 2, M = 3) $WS_2$ (D = 3, M = 2) (t = 10) | Grinding (R = 2) | None |
| Ex. 4 | D | 1. Grinding (R = 3) 2. Zn layer (t = 8) | Ti—O $MoS_2$ (D = 2, M = 3) (t = 15) | 1. Grinding (R = 3) 2. Zn layer (t = 15) | Polyamideimide resin $MoS_2$ (D = 5, M = 3.5) (t = 35) (T = 260) |
| Ex. 5 | A | Grinding (R = 2) | None | 1. Grinding (R = 3) 2. Zn—Fe layer (t = 1.5) | Polyamideimide resin $MoS_2$ (D = 1, M = 3) (t = 25) (T = 260) |
| Ex. 6 | A | Grinding (R = 2) | None | 1. Grinding (R = 3) 2. Zn—Fe layer (t = 50) | Polyamideimide resin $MoS_2$ (D = 5, M = 3) (t = 25) (T = 260) |

TABLE 2-continued

|  |  | Pin[3] |  | Box[4] |  |
|---|---|---|---|---|---|
| Example No.[1] | SM[2] | Pretreatment | Lubricating Coating | Pretreatment | Lubricating Coating |
| Ex. 7 | B | Grinding (R = 3) | None | 1. Grinding (R = 3) 2. Zn layer (t = 15) | Liquid lubricating coating A in Table 3 (t = 30) |
| Ex. 8 | B | Grinding (R = 3) | None | 1. Grinding (R = 3) 2. Zn—Fe layer (t = 15) | Liquid lubricating coating B in Table 3 (t = 100) |
| Ex. 9 | C | 1. Grinding (R = 3) 2. Zn layer (t = 12) | None | 1. Grinding (R = 3) 2. Zn layer (t = 15) | Polyamideimide resin $MoS_2$ (D = 3, M = 4) (t = 30) (T = 260) |
| Ex. 10 | B | 1. Grinding (R = 3) 2. Zn phosphate coat. (t = 20) | None | 1. Grinding (R = 3) 2. Zn layer (t = 15) | Polyamideimide resin $MoS_2$ (D = 3, M = 4) (t = 30) (T = 260) |
| Ex. 11 | C | 1. Grinding (R = 3) 2. Zn phosphate coat. (t = 20) | None | 1. Grinding (R = 3) 2. Zn layer (t = 20) | Liquid lubricating coating C in Table 3 (t = 150) |
| Ex. 12 | C | 1. Grinding (R = 3) 2. Oxalate coat. (t = 10) | None | 1. Sand blasting (R = 20) 2. Zn layer (t = 25) | Epoxy resin $MoS_2$ (D = 5, M = 4) (t = 27) (T = 230) |
| Ex. 13 | A | 1. Grinding (R = 3) 2. K borate coat. (t = 5) | None | 1. Sand blasting (R = 10) 2. Zn—Fe layer (t = 15) | Phenolic resin Graphite (D = 2, M = 4) (t = 25) (T = 200) |
| Comp. Ex. 1 | A | Grinding (R = 3) | None | 1. Grinding (R = 3) 2. Mn phosphate coat. (t = 20) | Polyamideimide resin $MoS_2$ (D = 5, M = 4) (t = 25) (T = 260) |
| Comp. Ex. 2 | C | Grinding (R = 3) | None | 1. Grinding (R = 3) 2. Fe plating (t = 15) 3. Mn phosphate coat. (t = 20) | Polyamideimide resin $MoS_2$ (D = 5, M = 4) (t = 35) (T = 260) |
| Comp. Ex. 3 | A | 1. Grinding (R = 2) 2. Zn layer (t = 8) | None | 1. Grinding (R = 3) 2. Zn layer (t = 15) | None |

(Notes)
[1]Ex: Example; Comp. Ex: Comparative Example
[2]SM: Steel Mark (in Table 1)
[3],[4]"Ti—O" indicates an inorganic polymeric compound having a Ti—O skeleton;
"R" indicates a surface roughness, Rmax ($\mu$m);
"D" indicates the average particle size ($\mu$m) of a lubricating powder;
"M" indicates the mass ratio of lubricating powder/binder;
"t" indicates the thickness of a coating ($\mu$m); and
"T" indicates the temperature (° C.) of heat treatment for curing of a solid lubricating coating.

TABLE 3

| Coating composition to form a liquid lubricating coating (wt %) | | | | | |
|---|---|---|---|---|---|
| | | | Coating composition | | |
| Component | | | A | B | C |
| Solvent | | | 50 | 40 | 50 |
| Base lubricant | | Z-1 | 25 | — | 15 |
| | | Z-2 | — | 20 | — |
| | | Z-3 | — | — | 5 |
| Thermoplastic resin powder | | Y-1 | — | 4 | — |
| | | Y-2 | — | — | 5 |
| Extreme pressure agent | | X-1 | — | 2 | 2 |
| | | X-2 | — | 3 | — |
| | | X-3 | — | — | 3 |
| Other lubricant | | W-1 | 10 | — | — |
| | | W-2 | 10 | 15 | 20 |
| | | W-3 | 5 | 16 | — |
| Base Number (mgKOH/g) | | | 200 | 83 | 160 |
| Sap. Number (mgKOH/g) | | | 40 | 45 | 72 |

Solvent: Mineral spirit (JIS K2201 4)
Base lubricant:

Z-1: Highly basic Ca sulfonate (base number: 400 mgKOH/g)
Z-2: Highly basic Mg salicylate (base number: 150 mgKOH/g)
Z-3: Highly basic Ca phenate (base number: 400 mgKOH/g)
Thermoplastic resin powder:

Y-1: Polyethylene powder (particle diameter 20 $\mu$m)
Y-2: Acrylic resin powder (particle diameter 2 $\mu$m)

TABLE 3-continued

Exterme pressure agent:

X-1: Sulfurized lard (S: 10%, Sap. Number 180 mgKOH/g)
X-2: Dilauryl hydrogen phosphate
X-3: Zinc dialkyldithiophosphate (Zn: 8%, P: 9%, S: 17%)
Other luburicant:

W-1: Beef tallow fatty acid Ca soap (Sap. Number 20 mgKOH/g)
W-2: Trimethylolpropane trioleate (Sap. Number 20 mgKOH/g)
W-3: Purified mineral oil (ISO VG46)
Base number and saponification number (sap. number) are values for the coating formed after evaporation of solvent.

TABLE 4

Procedure of repeated make-up and break-out

| | |
|---|---|
| Cycles 1–10 | Make-up and break-out at room temperature (RT) |
| Cycle 11 | Make-up at RT → heating for 24 hrs at 400° C. → cooling down to RT → break-out at RT |
| Cycles 12–15 | Make-up and break-out at RT |
| Cycle 16 | Make-up at RT → heating for 24 hrs at 400° C. → cooling down to RT → break-out at RT |
| Cycles 17–20 | Make-up and break-out at RT |

TABLE 5

| Example No.[3] | Occurrence of seizure or galling[1] (FIG.: Cycle number) | | | | | | | | | | | | | | | Rusting[2] | |
|---|---|---|---|---|---|---|---|---|---|---|---|---|---|---|---|---|---|
| | 6 | 7 | 8 | 9 | 10 | 11 | 12 | 13 | 14 | 15 | 16 | 17 | 18 | 19 | 20 | Pin | Box |
| Ex. 1 | ○ | ○ | ○ | ○ | ○ | ○ | ○ | ○ | ○ | ○ | ○ | ○ | ○ | ○ | ○ | — | ○ |
| Ex. 2 | ○ | ○ | ○ | ○ | ○ | ○ | ○ | ○ | ○ | ○ | ○ | ○ | ○ | ○ | ○ | — | ○ |
| Ex. 3 | ○ | ○ | ○ | ○ | ○ | ○ | ○ | ○ | ○ | ○ | ○ | ○ | ○ | ○ | ○ | ○ | — |
| Ex. 4 | ○ | ○ | ○ | ○ | ○ | ○ | ○ | ○ | ○ | ○ | ○ | ○ | ○ | ○ | ○ | ○ | ○ |
| Ex. 5 | ○ | ○ | ○ | ○ | ○ | ○ | ○ | ○ | ○ | ○ | ○ | Δ | Δ | Δ | — | | Δ |
| Ex. 6 | ○ | ○ | ○ | ○ | ○ | ○ | ○ | ○ | ○ | ○ | ○ | ○ | Δ | Δ | — | | ○ |
| Ex. 7 | ○ | ○ | ○ | ○ | ○ | ○ | ○ | ○ | ○ | ○ | ○ | Δ | Δ | Δ | — | | ○ |
| Ex. 8 | ○ | ○ | ○ | ○ | ○ | ○ | ○ | ○ | ○ | ○ | ○ | ○ | Δ | Δ | — | | ○ |
| Ex. 9 | ○ | ○ | ○ | ○ | ○ | ○ | ○ | ○ | ○ | ○ | ○ | ○ | ○ | ○ | — | | ○ |
| Ex. 10 | ○ | ○ | ○ | ○ | ○ | ○ | ○ | ○ | ○ | ○ | ○ | ○ | ○ | ○ | ○ | — | ○ |
| Ex. 11 | ○ | ○ | ○ | ○ | ○ | ○ | ○ | ○ | ○ | ○ | ○ | Δ | Δ | Δ | — | | ○ |
| Ex. 12 | ○ | ○ | ○ | ○ | ○ | ○ | ○ | ○ | ○ | ○ | ○ | ○ | ○ | ○ | ○ | — | ○ |
| Ex. 13 | ○ | ○ | ○ | ○ | ○ | ○ | ○ | ○ | ○ | ○ | ○ | ○ | ○ | ○ | ○ | — | ○ |
| Com Ex. 1 | ○ | ○ | Δ | Δ | Δ | X | — | — | — | — | — | — | — | — | — | | X |
| Com Ex. 2 | ○ | ○ | ○ | Δ | Δ | Δ | X | — | — | — | — | — | — | — | — | | X |
| Com Ex. 3 | X | — | — | — | — | — | — | — | — | — | — | — | — | — | — | ○ | ○ |

(Notes)
[1]○: No seizure or galling; Δ: Slight seizure (repairable); X: Galling (unrepairable); —: Not performed.
[2]○: No rusting; Δ: Slight rusting but unproblematic; X: Significant rusting (problematic); —: Not tested.
[3]Ex: Example; Com Ex.: Comparative Example As can be seen from Table 5, the threaded joints of Examples 1 to 13 in which the box and/or the pin had been subjected to surface treatment in accordance with the present invention had improved galling resistance and rust-preventing properties. Regarding rust-preventing properties, slight rusting was observed in the salt spray test in Example 5 in which the lower porous zinc-iron alloy layer had a small thickness of 1.5 micrometers, but it was of an unproblematic extent. In this Example 5, and in Example 6 in which the lower layer had a large thickness of 50 micrometers, as well as in Examples 7, 8, and 11 in which the lubricating coating was liquid, slight seizure occurred during make-up in the 18th or 19th cycles and later in the repeated make-up and break-out test, but the test could be carried on up to the final 20th cycle by performing a normal repair procedure. From the results of Examples 7, 8, and 11, it is estimated that a heavy metal powder-free liquid lubricating coating has a slightly lower lubricity than a solid lubricating coating.

In Comparative Examples 1 and 2 in which the lower layer was comprised of manganese phosphate or a combination of iron plating and manganese phosphate, rusting was observed on the entire surface in the salt spray test. Furthermore, although the lower manganese phosphate layer was a porous layer, galling occurred in the 11 th or 12th cycle in the repeated make-up and break-out test, and the test had to stop in that cycle. It seems that galling occurred easily by rusting which caused the lubricating coating to be detached easily and the substrate surface to have an increased roughness.

In Comparative Example 3, no rusting was observed in the salt spray test. However, galling occurred in the 6th cycle in the repeated make-up and break-out test. It was confirmed that galling could not be prevented by a blast-plated, porous zinc layer alone in the prior art unless overlaid with a conventional compound grease containing a heavy metal powder.

INDUSTRIAL APPLICABILITY

A threaded joint according to the present invention exhibits improved lubricity, rust-preventing properties, and gas tightness without application of a lubricating grease containing a heavy metal powder such as a compound grease. Furthermore, these properties are maintained at a high temperature, unlike for a compound grease. As a result, even in the cases where it is used to connect oil well pipes in a high-temperature oil well such as a deep well or steam-injected well, it is possible to eliminate or minimize the occurrence of galling during repeated make-up and break-out and maintain good gas tightness without possible environmental pollution by a heavy metal powder.

The present invention has been described with respect to certain embodiments and the disclosure set forth above is merely for illustration and is not intended to restrict the present invention. It will be appreciated by those skilled in the art that numerous variations and modifications may be made to the invention as described above.

What is claimed is:

1. A threaded joint for steel pipes comprising a pin and a box capable of mating with each other, the pin having an externally threaded portion and an unthreaded metal contact portion as a mating surface, and the box having an internally threaded portion and an unthreaded metal contact portion as a mating surface, characterized in that the mating surface of at least one of the pin and the box is coated with a lower porous zinc or zinc alloy layer and an upper lubricating coating selected from a solid lubricating coating and a liquid, heavy metal powder-free coating based on an organic acid metal salt.

2. A threaded joint according to claim 1 wherein the lower porous zinc or zinc alloy layer and the upper lubricating coating are on the mating surface of only one of the pin and the box.

3. A threaded joint according to claim 2 wherein the mating surface of the other of the pin and the box has one or more coatings selected from the porous zinc or zinc alloy layer, a metal plated coating, a phosphate coating, an oxalate coating, and a borate coating.

4. A threaded joint according to claim 1 wherein the porous zinc or zinc alloy layer has a thickness of from 2 to 40 micrometers.

5. A threaded joint according to claim 1 wherein the porous zinc or zinc alloy layer is formed by impact plating.

6. A threaded joint according to claim 5 wherein the impact plating is performed by blast plating.

7. A threaded joint according to claim 1 wherein the lubricating coating is a solid lubricating coating which comprises a powder exhibiting a solid lubrication action dispersed in an organic or inorganic binder.

8. A threaded joint according to claim 1 wherein the lubricating coating is a liquid lubricating coating based on a highly basic organic acid metal salt.

9. A threaded joint according to claim 8 wherein the liquid lubricating coating further comprises one or more components selected from a thermoplastic resin powder, an extreme pressure agent, and a lubricant other than the highly basic organic acid metal salt.

10. A threaded joint according to claim 2 wherein the lubricating coating is a solid lubricating coating which comprises a powder exhibiting a solid lubrication action dispersed in an organic or inorganic binder.

11. A threaded joint according to claim 3 wherein the lubricating coating is a solid lubricating coating which comprises a powder exhibiting a solid lubrication action dispersed in an organic or inorganic binder.

12. A threaded joint according to claim 4 wherein the lubricating coating is a solid lubricating coating which comprises a powder exhibiting a solid lubrication action dispersed in an organic or inorganic binder.

13. A threaded joint according to claim 5 wherein the lubricating coating is a solid lubricating coating which comprises a powder exhibiting a solid lubrication action dispersed in an organic or inorganic binder.

14. A threaded joint according to claim 6 wherein the lubricating coating is a solid lubricating coating which comprises a powder exhibiting a solid lubrication action dispersed in an organic or inorganic binder.

15. A threaded joint according to claim 2 wherein the lubricating coating is a liquid lubricating coating based on a highly basic organic acid metal salt.

16. A threaded joint according to claim 3 wherein the lubricating coating is a liquid lubricating coating based on a highly basic organic acid metal salt.

17. A threaded joint according to claim 4 wherein the lubricating coating is a liquid lubricating coating based on a highly basic organic acid metal salt.

18. A threaded joint according to claim 5 wherein the lubricating coating is a liquid lubricating coating based on a highly basic organic acid metal salt.

19. A threaded joint according to claim 6 wherein the lubricating coating is a liquid lubricating coating based on a highly basic organic acid metal salt.

20. A threaded joint according to claim 3 wherein the mating surface of the other of the pin and the box does not include a lubricating coating thereon.

* * * * *